United States Patent [19]
Rego

[11] Patent Number: 6,157,373
[45] Date of Patent: Dec. 5, 2000

[54] METHOD AND APPARATUS FOR DISPLAYING IMAGES

[75] Inventor: Alan W. Rego, Woodbury, Conn.

[73] Assignee: Trex Medical Corporation, Danbury, Conn.

[21] Appl. No.: 08/970,776

[22] Filed: Nov. 14, 1997

[51] Int. Cl.$^7$ ........................................... G09G 5/00
[52] U.S. Cl. ............................................... 345/173
[58] Field of Search .................................. 345/173, 174, 345/175, 176, 178, 179, 180, 181, 182, 183, 87, 89, 102, 103; 40/361, 367

[56] References Cited

U.S. PATENT DOCUMENTS 5,159,771  11/1992  Ohlson .
5,289,520  2/1994   Pellegrino et al. .
5,430,964  7/1995   Inbar et al. .

FOREIGN PATENT DOCUMENTS

WO9301564  1/1993  WIPO .
WO9514950  6/1995  WIPO .

OTHER PUBLICATIONS

Brochures: Keytec Home of the *Magic Touch*, pp. 6–26.
Brochures: Introducing . . . SmartLight—Digital Film Viewer.

*Primary Examiner*—Xiao Wu
*Attorney, Agent, or Firm*—Ware, Fressola, Van Der Sluys & Adolphson LLP

[57] ABSTRACT

A method and apparatus for displaying a digital image of at least a portion of an object displayed in a film transparency having object identifying indicia thereon is provided. The apparatus uses a position sensitive panel having a surface for supporting the film transparency and further having an output for providing an output signal corresponding to the two dimensional spatial position of a selected point of interest on the panel. The apparatus is further provided with an object identifying indicia reader having an output for providing an output signal corresponding to object identifying indicia on the film transparency. In one embodiment, a digital image of the object depicted on a film transparency can be displayed by simply touching the transparency which causes an associated computer controller to identify the transparency through the indicia thereon and recall corresponding digital image data. In another embodiment, a digital image of a selected point of interest on the film transparency can be displayed by touching the transparency at the desired location. The coordinates of the point touched on the panel together with the information contained in the indicia are provided to the associated computer controller to create the digital image display. The apparatus and method is particularly useful for fast screening of medical images with the added benefit of digital image enhancement capabilities when needed.

12 Claims, 4 Drawing Sheets

METHOD AND APPARATUS FOR DISPLAYING IMAGES

BACKGROUND OF THE INVENTION

1. Field of the Invention

The present invention generally relates to the presentation of images. More particularly, the present invention relates to a method and apparatus for selecting and displaying a stored digital image of an object, or a portion thereof, corresponding to an image of that object displayed on a film transparency. The present invention is particularly useful in the display and evaluation of medical images, and is especially useful in displaying and evaluating digital or digitized mammographic images.

2. Description of the Prior Art

For decades, mammographic images of breasts have been acquired by exposing a breast to X-rays wherein the varying intensity of X-rays passing through the breast tissue is captured on film to form a mammographic image. In mammography and other medical imaging, medical X-ray transparencies are usually examined by placing them over a light box or illuminator to allow light to pass through portions of the image. Normally, such illuminated transparencies are generally examined or screened by a radiologist who is looking for abnormalities. When an apparent abnormality is found, such as a lesion, it is usually more carefully examined with a magnifying glass, for example.

One example of an illuminator for viewing medical X-ray transparencies may be found in U.S. Pat. No. 5,159,771 wherein X-ray film transparencies are advanced consecutively across a lighted surface in a horizontal direction from a magazine. The device enables such transparencies to be screened relatively rapidly and automatically.

Another example of an illuminator may be found in U.S. Pat. No. 5,430,964. This patent discloses an apparatus for viewing transparencies which masks any display areas not covered by transparencies by generating masks without moving parts and further adapts the luminance level of the image under study and of other display areas to optimal viewing conditions required by the observer such as the radiologist.

In recent years, the use of digital imaging in mammography and other medical imaging has become more widespread due to several advantages that digital imaging has over film based imaging. Digital images do not require an illuminator such as that described above. However, when the entire breast is imaged digitally, for example, the corresponding data files for such images are typically large. The display of such images in their entireties can be very demanding of scarce computer resources. Even for a fast computer system used to display such images, each of the large data files corresponding to an image may take from several seconds up to minutes to retrieve, process and display. In the case where hundreds of images must be evaluated in a relatively short period of time, the several seconds (or minutes in some cases) required per image may be unacceptable. Also, the imaging apparatus used to acquire the image usually has a higher spatial resolution than the spatial resolution of the typical display device, such as a monitor.

While both of the aforementioned illuminators allow rapid evaluation of X-ray film images, these devices lack the digital image enhancement capability such as windowing, contrast stretching, histogram equalization, filtering, edge enhancing, zooming and the like, all of which are useful for the evaluation of medical images, for example. While the digital image display devices have the image enhancement capability, digital display devices currently lack the throughput capability of the aforementioned illuminators.

Thus, there is a need for a device for screening film images, especially medical images, which provides the throughput of the illuminators described above and which also provides the user with the ability to look at selected film images, or portions thereof, with the image enhancing capabilities associated with devices for displaying digital images.

SUMMARY OF THE INVENTION

It is an object of the present invention to provide a method and apparatus for displaying a stored digital image corresponding to an image displayed on a film transparency by touching or pointing to the transparency.

It is a further object of the present invention to provide a method and apparatus for displaying a stored digital image corresponding to a portion of an image displayed on a film transparency by touching or pointing to a portion of the film transparency in the vicinity of the portion desired to be displayed digitally.

These objects are accomplished, at least in part, by providing a method and apparatus for displaying a digital image of at least a portion of an object displayed in a film transparency having object identifying indicia thereon in accordance with the present invention. The apparatus comprises a position sensitive panel having a surface for supporting the film transparency and further having an output for providing an output signal corresponding to the two dimensional spatial position of a selected point of interest on the panel. The apparatus is further provided with an object identifying indicia reader having an output for providing an output signal corresponding to object identifying indicia on the film transparency; a storage device for storing data corresponding to a digital image of the object displayed in the film transparency; and a display device for displaying digital images. A computer controller is operatively connected to the position sensitive panel output, the object identifying indicia reader output, the storage device and the display device. By touching a point on the position sensitive panel, the computer controller can retrieve and process corresponding data stored on the storage device and display that data in the form of a digital image on the display device.

The basic method of the present invention comprises several steps, including: storing data corresponding to a digital image of an object on a storage device; providing a film transparency displaying an image of the object; providing object identifying indicia on the film transparency; reading the object identifying indicia on the film transparency; recalling the stored data from the storage device corresponding to the object identifying indicia read; and displaying a digital image of the object from the data so recalled.

BRIEF DESCRIPTION OF THE DRAWINGS

The drawings, not drawn to scale, include.

DETAILED DESCRIPTION OF THE INVENTION

As described hereinafter, the present invention provides a method and apparatus for displaying a stored digital image of an object corresponding to the image of the object displayed on a film transparency. The method and apparatus of the present invention is particularly useful in the display and evaluation of medical images, such as mammography images, and therefore, the invention will be described in the context of displaying and evaluating mammographic images. However, the present invention can also be used to display and evaluate any type of image including aerial photos, navigation charts and the like.

Figure 1:
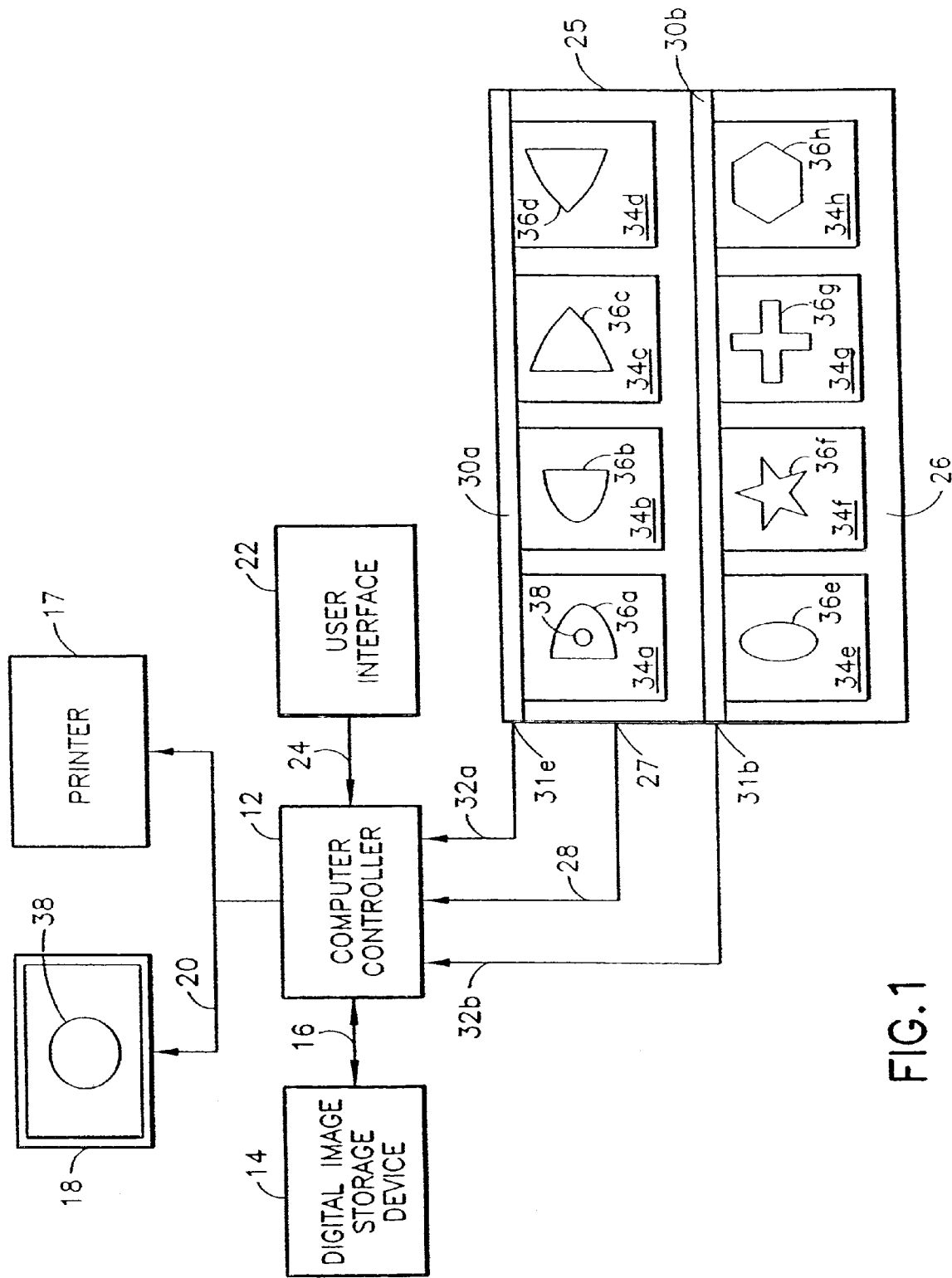
FIG. 1, which is a simple schematic diagram illustrating the apparatus of the present invention which includes a position sensitive panel, an indicia reader, a computer controller, a storage device, user interface, display and printer.

Referring now to FIG. 1, there is illustrated one embodiment of the apparatus 10 of the present invention. The central part of the apparatus 10 is formed by a computer controller 12. While any type of computer controller 12 may be used, the computer controller should have a fast central processing unit, such as a 233 Mhz Pentium™ central processing unit or equivalent, and a large amount of random access memory, such as 256M bytes. Any operating system should work with the present invention including the Windows NT™ operating system made by Microsoft Corporation. The computer controller 12 is connected to a storage device 14 via data line 16. The storage device 14 must have sufficient capacity to store many high contrast and high spatial resolution digital images. For example, it is contemplated that an SCSI interface fixed disk drive having 2 giga-bytes of storage capacity will work adequately for the purposes of screening a plurality of transparencies. Alternatively, the storage device 14 may be a fixed disk drive which is located remotely from the computer controller 12 and accessible via a typical network connection. The computer controller 12 is also connected to a high resolution video display 18 via data line 20. In the preferred embodiment, the video display should have at least a 1280 by 1024 pixel resolution capability. The computer controller 12 is also connected to a user interface 22 via data line 24. The user interface may be a standard keyboard, mouse, track ball or any combination thereof which will enable the user to select modes of operation as desired. As will be evident to those skilled in the art, the computer controller, storage device, video display and user interface may be combined in the form of a personal computer. Also, if desired, the apparatus 10 may be equipped with a printing device 17 to print the image displayed on display 18.

The apparatus of the present invention is further formed by a position sensitive planar panel 25 having a surface 26 for supporting at least a portion of a film transparency and further having an output 27 which is connected to the controller 12 via data line 28, which may be an RS-232 compatible data line, for example. In the preferred embodiment, the surface 26 of the position sensitive panel 25 is dimensioned to support multiple transparencies. According to the present invention, the panel may be formed from any device in which a portion of the transparency may be supported and the two dimensional coordinates of a selected position on the panel can be indicated via output 27 and data line 28 to the computer controller 12. Preferably, the surface 26 of the panel 25 is light transmissive such that when the panel 25 is back-lit, light may pass through the surface 26 of the panel 25 to illuminate film transparencies positioned thereon. Such panels may be formed from back-lit digitizers, such as Model 2200 digitizer manufactured by Numonics, Inc., which has a mouse type cursor for selecting points of interest on the digitizer. With such a digitizer, a signal representing the two dimensional coordinates of a selected point of interest is provided at output 27 by positioning the mouse type cursor over the selected point of interest and depressing a button on the mouse type cursor. Preferably, the panel 25 is made by overlaying a touch screen interface, such as the Magic Touch™ touch screen interface made by Keytec, Inc. over a light trnnsmissive panel, such as a light box. A signal representing the two dimensional coordinates of a selected point of interest is provided at output 27 by merely touching the selected point of interest. Touch screen interface types that may be overlaid over light transmissive panels include capacitive, force vector, guided acoustic wave, resistive analog, strain gauge, surface acoustic wave, and infrared/scanning infrared. The type of touch screen interface used as the position sensitive panel 25 will vary with the particular use of the present invention. For example, the resistive and strain gauge types of touch screen interfaces provide high spatial resolution and may be useful where high spatial resolution is required. However, in other applications, a capacitive interface may be used where skin or conductive stylus contact is desired, for example.

The final element of the apparatus of the present invention is an indicia reader for reading information about an object on a transparency on the position sensitive panel 25. In FIG. 1, two indicia readers 30a and 30b having outputs 31a and 31b are illustrated and these outputs are connected to the computer controller 12 via data lines 32a and 32b, respectively. Each of the indicia readers 30a and 30b are utilized for reading object identifying indicia placed on a transparency to identify the object depicted on a transparency. The indicia readers 30a and 30b may also be used to determine the alignment of transparencies positioned on the panel for reference purposes. Such devices that can be used as indicia readers 31a and 31b include bar code readers, magnetic strip readers, or charge coupled device (CCD) imagers, for example. Of course, those skilled in the art will now appreciate that any device which can read information from a transparency, or a printed label applied thereto, and provide information so read to the computer controller 12 should work adequately.

As shown in FIG. 1, the panel 25 is of suitable dimensions to receive eight transparencies 34a–34h. Each of the transparencies 34a–34h has a different object 36a through 36h depicted thereon. Although the panel 25 is illustrated as described above, those skilled in the art will appreciate that the panel 25 need only be capable of receiving one transparency and that the throughput desired by the viewer will likely dictate the size of the panel 25 needed. As will be further explained below, in one mode of operation, a user of the apparatus of the present invention merely need touch one of the film transparencies 34a–34h to retrieve and display a corresponding digital image of the object depicted on the transparency on display 18. In another mode of operation, the user may touch a feature, such as feature 38 in transparency 34a, to retrieve and display a digital image of a region about the feature on display 18. With either mode of operation, the apparatus allows the viewer to maintain a high screening throughput because the majority of "normal" film transparencies may only need to be viewed with the light box in a conventional manner. However, those transparencies that contain areas of interest, as determined by viewing the film transparencies in the conventional manner, which need further examination can be viewed digitally simply by touching the transparency of the image of interest. Thus, screening throughput is only reduced when digital image viewing is deemed necessary.

Figure 2:
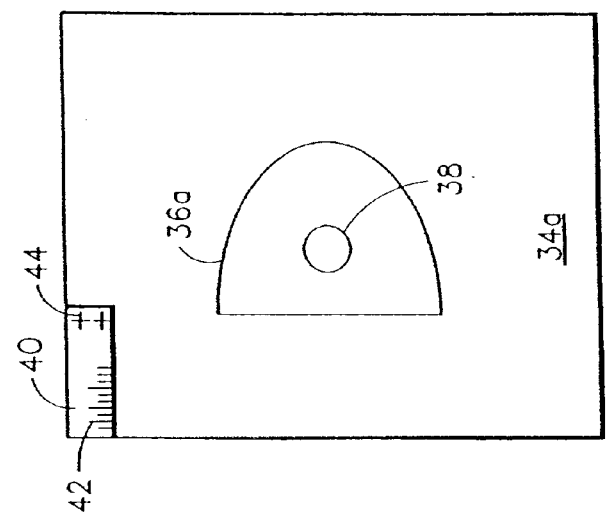
FIG. 2, which is a simple schematic illustration of a film transparency with an image of an object displayed and object and alignment identifying indicia thereon.

Referring to FIG. 2, an enlargement of transparency 34a having object 36a with feature 38 is shown. In actual practice, object 36a might be a mammographic image of a full breast and feature 38 might be a possible abnormal area, such as a lesion, within the mammographic image that a radiologist would like to examine further. In the case where the panel 25 may accept a plurality of transparencies, the transparencies, such as transparency 34a, are provided with object and alignment identifying indicia 40 in their upper left hand corner. Although shown in the upper left hand corner, the indicia 40 may be placed anywhere on the transparency including the top center or top right hand corner, as shown. The object and alignment identifying indicia 40 could be in the form of a common optically readable bar code which is either an image on the transparency or is reproduced on an adhesive label which is then applied to the transparency 34a. The identifying indicia 40 could also be in the form of a magnetically readable strip of information similar to that found on credit cards and the like, for example. In all cases, the object identifying portion 42 of the indicia includes particular information which enables a specific film transparency having a particular object image therein, such as transparency 34a, to be linked to a corresponding data file stored on storage device 14. Preferably, the object identifying portion 42 of the indicia may be the bar code form of the computer file name of the corresponding data file stored on the storage device 14, for example.

Whether the panel is of suitable size to receive only a portion of one transparency or a plurality, the horizontal, vertical and angular alignment of the transparency 34a must be known relative to the panel 25 to enable the apparatus to retrieve and display a selected portion of the object on the transparency. Accordingly, to determine the alignment of the transparency, the alignment identifying portion 44 of the indicia 40 may contain alignment reference information which enables the determination of the alignment of the transparency 34a relative to the panel 25. In FIG. 2, the alignment information is shown as two vertically arranged plus sign reference marks appearing in the left hand corner of the transparency 34a. These reference marks provide information about the vertical, horizontal and angular alignment of the transparency 34 relative to the panel 25. The reference marks need not be located as described, however, this location permits the indicia readers 30a and 30b to read the reference marks and determine the marks' positions. Alternatively, the reference marks may be located anywhere on the transparency and their position may be determined through the touching of each of the reference marks on the position sensitive panel 25 when the user is instructed to do so by the computer controller 12. In such an embodiment, the position sensitive panel 25 provides two dimensional coordinate output signals to the controller 12 corresponding to the position of each of the reference marks.

Those skilled in the art will appreciate that other means for determining or assuring the alignment of the transparency 34a on the panel 25 could be used without deviating from the spirit of the invention. For example, a passive means for assuring the alignment of the transparency 34a could be obtained by providing the transparency 34a with one or more notches at predetermined positions in one or more edges and by which registration of the notches against reference surfaces on the panel 25 would assure that transparencies are always aligned in the same predetermined positions on the panel 25. Also, in the context of an automatic film reading apparatus such as that shown in U.S. Pat. No. 5,159,771, the transport mechanism for transporting films from its magazine across its viewing surface could be used to provide transparency alignment information. Alignment or registration of a transparency on the position sensitive panel 25 may be determined by providing information about a point on the transparency and providing information regarding the size of the transparency, while assuming that the transparency is hung on the position sensitive panel 25 in a particular manner, such as vertically for example.

Figures 3A, 3B:
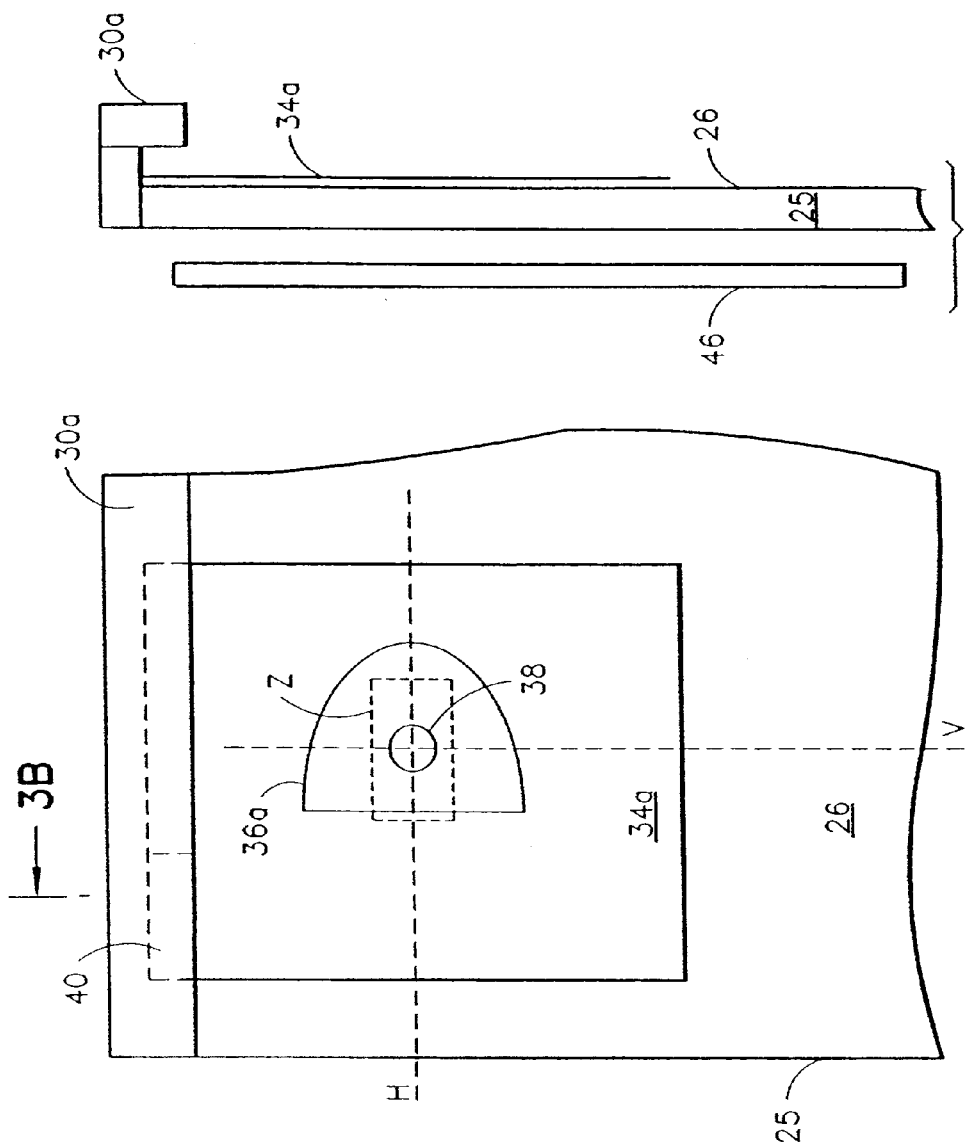
FIG. 3A, which is a simple schematic diagram illustrating a portion of the position sensitive panel having a film transparency thereon.
FIG. 3B, which is simple schematic cross-sectional view diagram of the portion of the position sensitive panel illustrated in FIG. 3A taken along the line 3B—3B.

FIGS. 3A and 3B illustrate the positioning of transparency 34a on panel 25. In the cross-sectional view of FIG. 3B, there is shown a light source 46 which provides the backlighting required, as described above. Further illustrated in FIG. 3A is a first dotted line H traversing the film transparency 34a in a horizontal manner and a second dotted line V traversing the film transparency 34a in a vertical manner. Dotted lines V and H intersect at feature 38. In the example provided herein, these dotted lines indicate the vertical V and horizontal H position of a selected point of interest which coincides with feature 38, for example. According to the present invention, when a user touches the panel surface 26 at the point represented by the intersection of H and V, the output 27 of panel 25 provides a signal to the computer controller 12 via line 28 representing the two dimensional coordinates H,V on the surface 26 of the panel 25 that has been touched, i.e., the selected point of interest. 25 In one embodiment of the apparatus, the touching of the panel 25 at coordinates H,V also causes the indicia reader 30a to read the indicia 40 on the transparency 34a and provide the computer controller 12 with a signal enabling the controller 12 to retrieve the data for the digital image stored on storage device 14 corresponding to transparency 34a and to display the image on display 18. If the apparatus is operated in a zooming mode, for example, the image retrieved and displayed by the computer controller may correspond to a predetermined zoom window Z centered about coordinates H,V as is illustrated in FIGS. 1 and 3A, which is a portion of the object 36a depicted on the transparency 34a. In either mode of operation, the image displayed on display 18 can be manipulated with the image enhancements described above. The aforementioned image enhancements that can be utilized in the present invention are described in U.S. Pat. No. 5,289,520 which is owned by the present assignee hereof and such description is incorporated herein by reference.

Figure 4A:
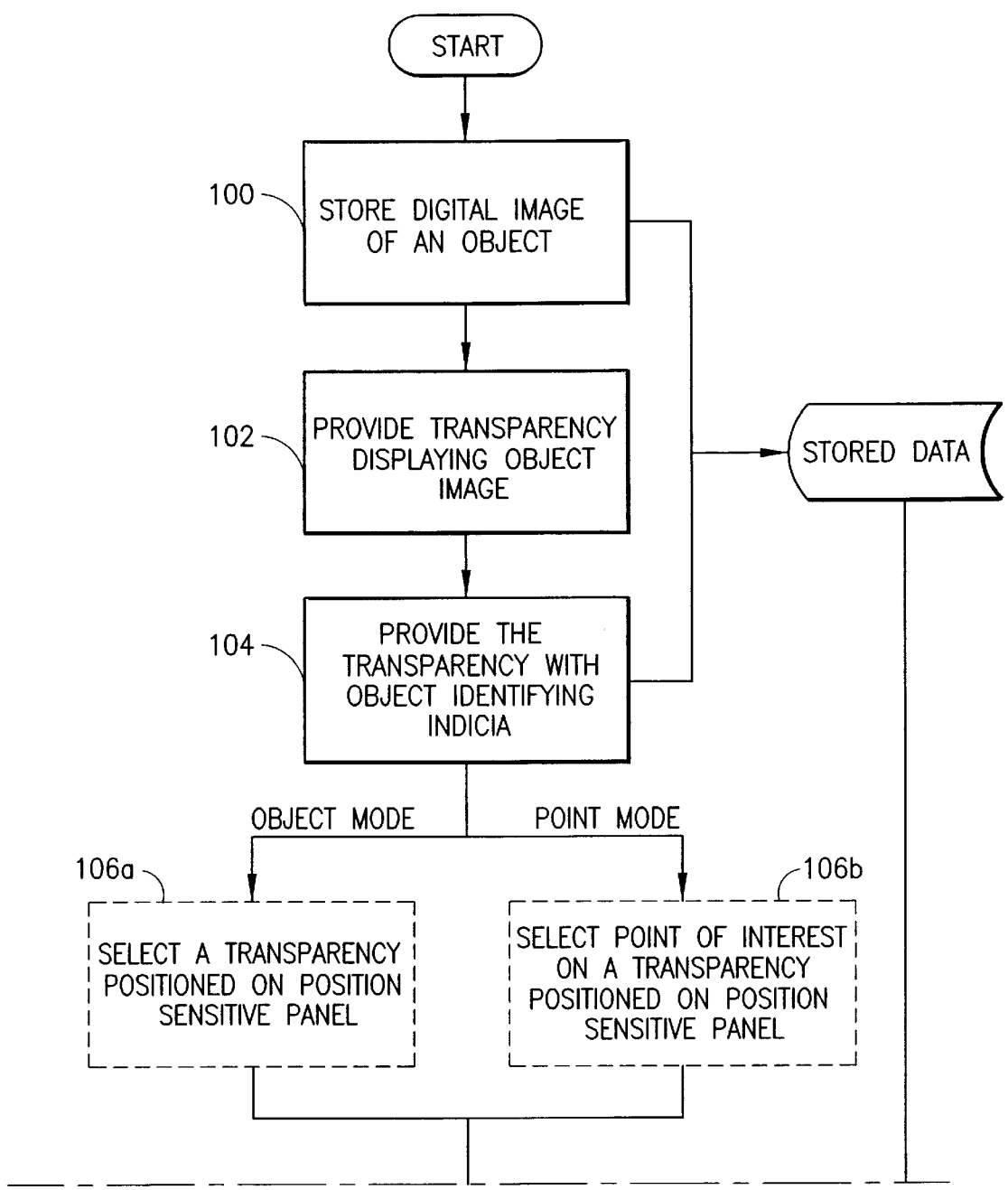
FIG. 4, which is a flow diagram of the method of the present invention.
Figure 4B:
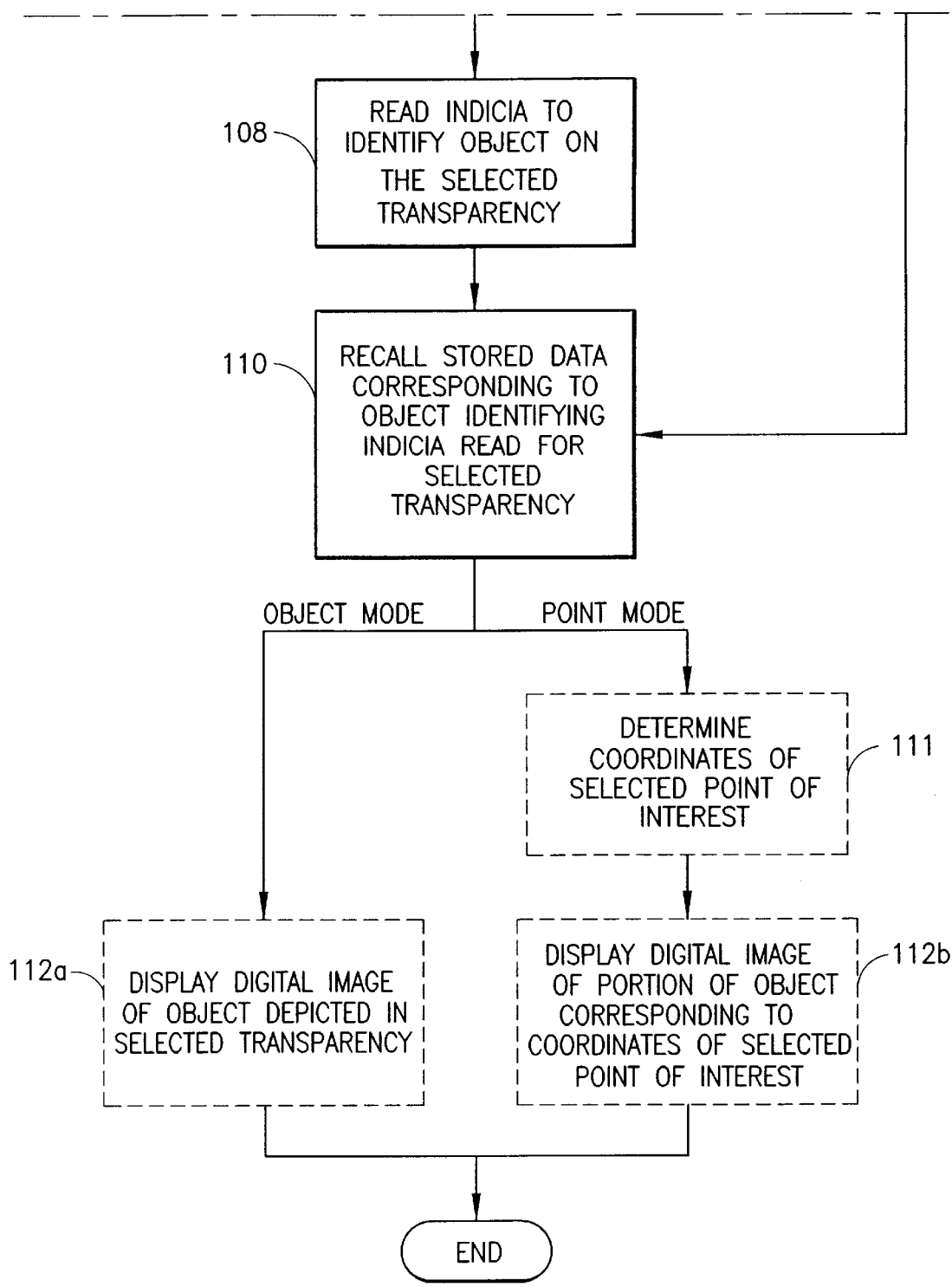

Referring to FIG. 4, according to one embodiment of the method of the present invention, data corresponding to the digital image of an object, such as a breast, is stored on the storage device 14 (step 100). A film transparency 34a having the same image of the object is provided (step 102). The transparency 34a is also provided with object identifying indicia 40 (step 104). The method may be operated in one of two modes: Object Mode or Point Mode. In the Object Mode, a transparency is selected on the position sensitive panel by touch, for example (step 106a). In the Point Mode, a point of interest is selected on a transparency positioned on the position panel by touching the point of interest, for example (step 106b). In both the Object Mode and the Point Mode, the object identifying indicia 40 on the transparency is read (step 108) to identify the object on the transparency and the data stored on the storage device corresponding to the object, as identified by the indicia, is recalled (step 110). In the Object Mode, a digital image of the object from the recalled data is displayed on display 18 (step 112*a*). In the Point Mode, the coordinates of the selected point of interest are determined (step 111) and the digital image of the portion of the object is displayed on display 18, the displayed image corresponding to a region about the determined coordinates of the selected point of interest.

In some cases the determination of the coordinates of the selected point of interest may further require a determination of the alignment of the transparency 34*a* on the position sensitive panel 25. However, if the apparatus is constructed so as to allow only one alignment of the transparency relative to the panel 25, such a determination step is not necessary.

It will thus be seen that the objects and advantages set forth above and those made apparent from the preceding descriptions, are efficiently attained and, since certain changes may be made in the above construction without departing from the scope of the invention, it is intended that the matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. An apparatus for displaying a digital image of at least a portion of an object displayed in a film transparency corresponding to the position of a selected point of interest on the film transparency, the film transparency being of a type having object and alignment identifying indicia thereon, the apparatus comprising:

a position sensitive panel having a surface for supporting the film transparency and further having an output for providing an output signal corresponding to a two dimensional spatial position of a selected point of interest on the panel;

an object identifying indicia reader having an output for providing an output signal corresponding to object identifying indicia read from the film transparency;

a storage device for storing data corresponding to a digital image of the object displayed in the film transparency; and a display device for displaying digital images; the apparatus further characterized in that it includes:

means for determining the horizontal, vertical and angular alignment of the film transparency relative to the position sensitive panel; and a computer controller operatively connected to the position sensitive panel output, the object identifying indicia reader output, the storage device and the display device, and wherein the controller is adapted to receive output signals from the indicia reader and the position sensitive panel, to recall data corresponding to the object in the film transparency from the data storage device based upon the output signals received and the determined horizontal, vertical and angular alignment of the film transparency relative to the panel, and to display a digital image on the display of at least a portion of the object displayed in the film transparency corresponding to a selected point of interest on the transparency.

2. The apparatus according to claim 1, wherein the position sensitive panel is a digitizer having a cursor for indicating the selected point of interest.

3. The apparatus according to claim 1, wherein the position sensitive panel has a touch sensitive means for determining the selected point of interest.

4. The apparatus according to claim 1, wherein the object identifying indicia reader is a bar code reader.

5. The apparatus according to claim 1, wherein the object identifying indicia reader is a magnetic strip reader.

6. The apparatus according to claim 1, wherein the object identifying indicia reader is a charge coupled device imager.

7. The apparatus according to claim 1, wherein the surface of the position sensitive panel is light transmissive.

8. The apparatus according to claim 1, wherein the apparatus further comprises a user interface.

9. The apparatus according to claim 1, wherein the apparatus further includes a means for printing at least a portion of an image displayed on the display.

10. A method for displaying a digital image of a selected portion of an object displayed in a film transparency having object and alignment identifying indicia thereon, the method comprising the steps of:

(a) storing data corresponding to a digital image of an object on a storage device;

(b) providing a film transparency displaying an image of the object and having object and alignment identifying indicia on a position sensitive panel having a surface for supporting the film transparency and further having an output for providing an output signal corresponding to the two dimensional spatial position of a selected point of interest on the panel;

(c) reading the object identifying indicia on the film transparency to identify the object;

(d) recalling the stored data from the storage device corresponding to the object identified by the identifying indicia read in step (c);

(e) selecting a point of interest on the film transparency;

(f) determining the horizontal, vertical and angular alignment of the transparency relative to the position sensitive panel and the coordinates of the selected point of interest on the film transparency; and (g) displaying a digital image of at least a portion of the object corresponding to the selected point of interest on the film transparency from the data recalled in step (d) and the horizontal, vertical, and angular alignment and the coordinates determined in step (f).

11. The method according to claim 10, wherein the step of selecting a point of interest is accomplished by touching a point on the transparency.

12. The method according to claim 10, wherein the method further comprises the step of centering the image displayed in step (g) about the selected point of interest.

* * * * *